United States Patent
Okamoto et al.

(10) Patent No.: US 6,799,279 B1
(45) Date of Patent: Sep. 28, 2004

(54) METHOD AND APPARATUS FOR STOPPING SUPPLY OF POWER TO A SPECIFIC FUNCTION FOR PLAYING CONTENTS STORED ON MEDIA IN RESPONSE TO A LOW BATTERY LEVEL

(75) Inventors: Ryuichi Okamoto, Studio City, CA (US); Hideki Matsushima, Studio City, CA (US); Masayuki Kozuka, Arcadia, CA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 896 days.

(21) Appl. No.: 09/598,251

(22) Filed: Jun. 21, 2000

(51) Int. Cl.[7] .............................. G06F 1/26; G06F 1/28; G06F 1/30; G06F 1/32; G06F 12/14
(52) U.S. Cl. ...................... 713/324; 713/300; 713/310; 713/322; 713/323; 713/340; 713/189
(58) Field of Search ................................ 713/300, 310, 713/320, 322, 323, 324, 340, 150, 182, 189, 161; 380/255, 277, 29, 287

(56) References Cited

U.S. PATENT DOCUMENTS 6,049,884 A * 4/2000 Tsuji ........................... 713/323
6,385,596 B1 * 5/2002 Wiser et al. .................. 705/51
6,389,535 B1 * 5/2002 Thomlinson et al. ....... 713/165
6,480,096 B1 * 11/2002 Gutman et al. ............ 340/5.31

FOREIGN PATENT DOCUMENTS

WO    WO 9709817 A2 * 3/1997

OTHER PUBLICATIONS

Ikram, N.; Shepherd, S.J.; "A cryptographically secure EW database with selective random access", MILCOM 97 Proceedings, vol.: 3, Nov. 2–5, 1997, pp. 1407–1411 vol. 3.*

* cited by examiner

Primary Examiner—Rehana Perveen
Assistant Examiner—James K. Trujillo
(74) Attorney, Agent, or Firm—Wenderoth, Lind & Ponack, L.L.P.

(57) ABSTRACT

A multiple function portable device prevents an occurrence of a situation in which a remainder of a battery is used up after a consumer utilizes a contents playing function of a portable device having a contents playing function, wherein not only the contents playing function but also basic functions inherent to the portable device become unavailable. A power supply control means commands a power supply means to stop the power supply to a contents playing function activator when the battery remainder measured by a battery remainder measuring means becomes lower than a predetermined value.

2 Claims, 5 Drawing Sheets

METHOD AND APPARATUS FOR STOPPING SUPPLY OF POWER TO A SPECIFIC FUNCTION FOR PLAYING CONTENTS STORED ON MEDIA IN RESPONSE TO A LOW BATTERY LEVEL

BACKGROUND OF THE INVENTION

1) Field of the Invention

The present invention relates to a portable device having multiple functions. More specifically, the present invention relates to a portable device that has a function of playing contents stored in a recordable media.

2) Description of the Related Art

Recently, due to the progress in the semi-conductor technology, memory cards have become smaller, and come to have a greater capacity. Memory cards store various contents such as music data and visual data. There have been considered portable devices such as a portable phone, a PDA, and a hand-held PC, which have a function of playing contents stored in such memory cards. The power source of such portable devices is generally a battery. Since the capacity of a battery is limited by its nature, there is a limit to the amount of time a portable device can operate in a continuous manner. Conventionally, the manner of supplying power to a portable device has been such that power is supplied to the function the consumer wishes to utilize as much as the function requires, as long as there is power left in the battery, regardless of the type of function.

However, in the aforesaid conventional power supply method, a situation can conceivably arise where the remainder of a battery is all gone after the consumer utilizes the contents play function. In such cases, the portable device is unusable not only with respect to its contents playing function, but also with respect to its basic functions as a portable device. Generally speaking, the contents playing functions require much power. Therefore, it is very likely that such a problem frequently occurs in the aforementioned conventional power supply method.

SUMMARY OF THE INVENTION

The present invention is to overcome the aforementioned problem. According to the present invention, power supply to the contents playing function is stopped once the remainder in a battery becomes lower than a predetermined value. In this manner, the present invention provides a portable device which has contents playing function and prevents in advance occurrence of a situation in which basic functions of the portable device become unavailable.

To attain this object, the multiple function portable device of the present invention includes a battery for supplying power, power remainder monitoring means for monitoring the remainder of the battery, power supply means for obtaining power from the battery and supplying the power to each function independently, and power supply control means for controlling the power supply means to control the power supply to each function.

DETAILED DESCRIPTION OF THE INVENTION

An embodiment of the present invention will now be explained with reference to the figures.

Figure 1:
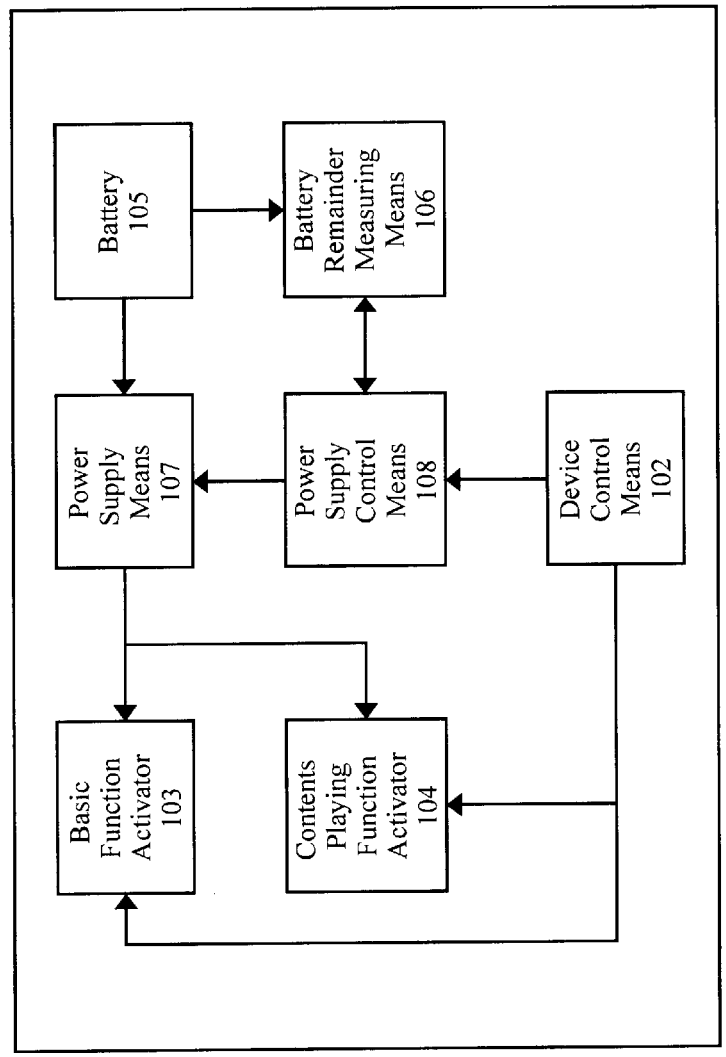
FIG. 1 shows a structure of a portable device having contents playing function in accordance with an embodiment of the present invention.

FIG. 1 is a view of the structure of a portable device having contents playing function, as a multiple function portable device in accordance with the embodiment. The portable device having contents playing function 101 herein can be realized as a portable phone, a wrist watch, or a PDA having a function of playing contents stored in a recordable media.

The portable device having contents playing function 101 includes device control means 102, a basic function activator 103, a contents playing function activator 104, a battery 105, battery remainder measuring means 106, power supply means 107, and power supply control means 108. Each of the structural elements will now be explained.

The device control means 102 controls the overall operation of the device. The basic function activator 103 activates the basic functions of the portable device. The basic functions herein refer to functions that the portable device inherently has. For instance, the basic function of a portable phone with contents playing function is a phone function.

The contents playing function activator 104 activates the function of playing contents that is stored in a recordable media. The structure and operation of the contents playing function activator 104 will be explained in detail later.

The battery 105 is a power source that supplies operational power to the portable device having contents playing function 101.

The battery remainder measuring means 106 measures the remainder of the battery 105, by using methods such as measuring the voltage of the battery 105.

The power supply means 107 obtains power from the battery 105, converts the power to a voltage required by each function activator, and supplies the voltage to each function activator. The power can be supplied to each function activator in an independent manner.

The power supply control means 108 controls the power supply means 107 to control the power supply to each function activator. The power supply control means 108 commands the power supply means 107 to stop the power supply to the contents playing function activator 104, when the battery remainder measured by the battery remainder measuring means 106 becomes lower than a predetermined value.

Figure 2:
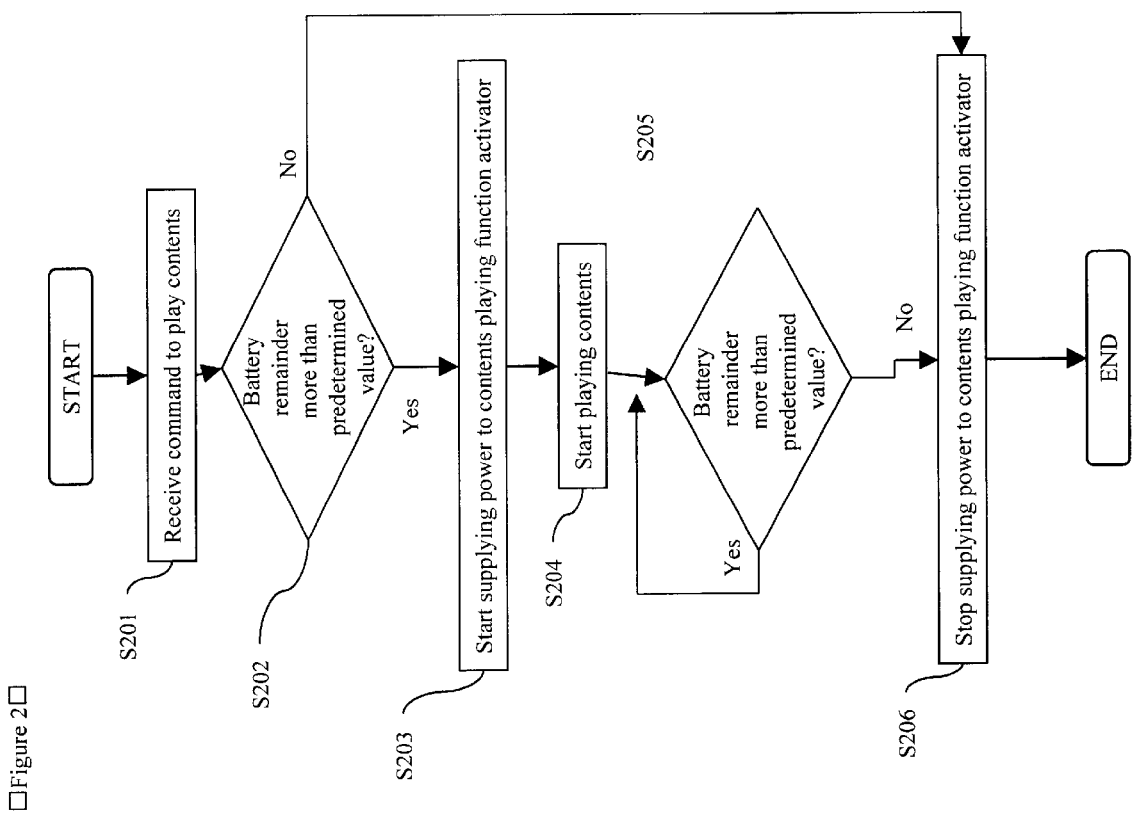
FIG. 2 is a flowchart of an operation of controlling power supply to the contents playing function activator, performed by the portable device having contents playing function in accordance with the embodiment of the present invention.

The portable device having contents playing function 101 which has the aforesaid structure controls the power to be supplied to the contents playing function activator 104, thereby preventing an occurrence of a situation in which functions that the portable device inherently has become unavailable. The operation of this control will now be explained with reference to the flowchart shown in FIG. 2.

In S201, the device control means 102 receives a command to play contents inputted by the user via input means such as a remote controller. The input means is not shown in the figures. Then, the device control means 102 reports to the power supply control means 108 the receipt of the command to play contents.

In S202, the power supply control means 108 commands the power remainder measuring means 106 to measure the remainder of the battery 105. Then, the power supply control means 108 compares the battery remainder measured by the battery remainder measuring means 106 with a predetermined value. If it has been determined that the battery remainder is lower than the predetermined value in S202, a data displayer informs the user that the contents cannot be played due to insufficient battery remainder. Then, the process is terminated. The data displayer is not shown in the figures. If it has been determined that the battery remainder is above the predetermined value in S202, then the power supply control means 108 commands the power supply means 107 to supply power to the contents playing function activator 104.

In S203, the power supply means 107 starts supplying power to the contents playing function activator 104.

In S204, the contents playing function activator 104 starts playing the contents.

After a predetermined period of time elapsed since the contents playing function activator 104 started playing the contents, the power supply control means 108 commands the battery remainder measuring means 106 to measure the remaining battery in S205. Then, the power supply control means 108 compares the battery remainder measured by the battery remainder measuring means 106 with a predetermined value. If it has been determined that the battery remainder is lower than the predetermined value in S205, the power supply control means 108 commands the power supply means 107 to stop supplying power to the contents playing function activator 104.

In S206, the power supply means 107 stops supply of power to the contents playing function activator 104. Then, the data displayer, which is not shown in the figures, reports to the user that playing of the contents will be stopped due to insufficient battery remainder. Then, the process is terminated. If it has been determined that the battery remainder is above the predetermined value in S205, no process is performed. After the predetermined period of time elapses, the process S205 will be repeated.

Next, a recordable media which stores contents to be played by the portable device having contents playing function 101 will now be explained with reference to FIG. 3.

Figure 3:
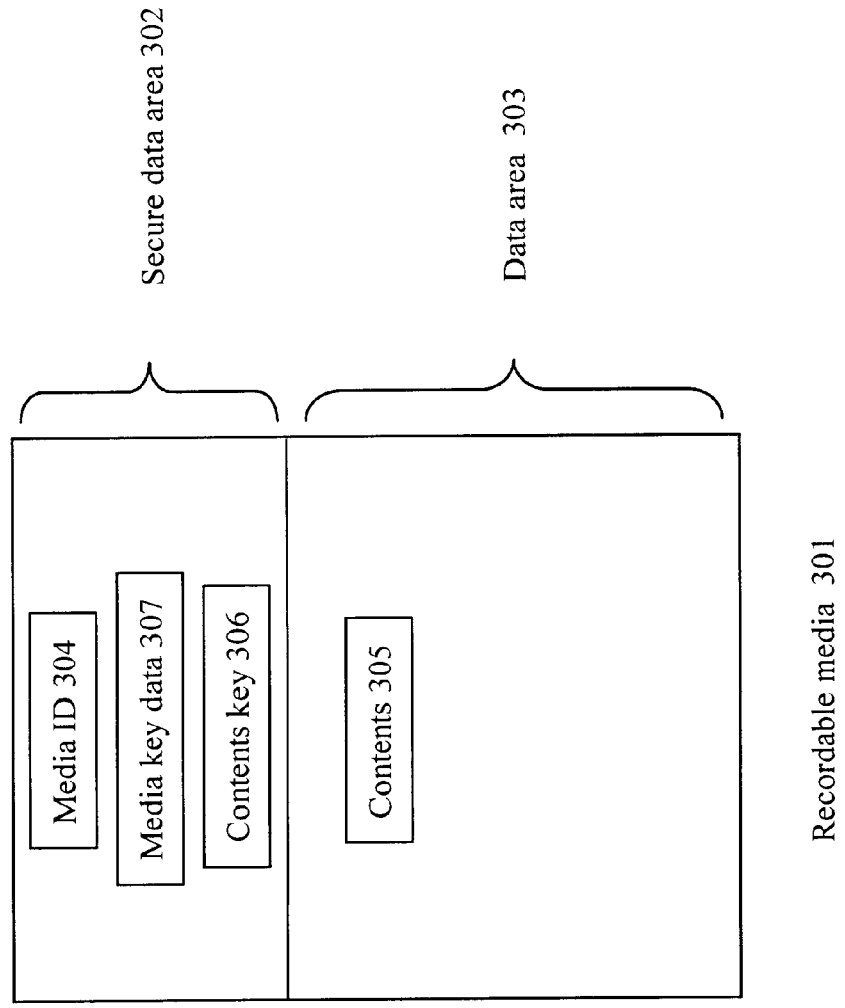
FIG. 3 shows a structure of a recordable media.

As seen in FIG. 3, a recordable media 301 is formed of two different memory areas, namely a secure data area 302 and a data area 303. The secure data area 302 herein refers to an area that cannot be accessed unless there is an authentication between the recordable media 301 and a device accessing the recordable media 301.

A media ID 304 is data which is able to uniquely identify the recordable media 301. The media ID 304 is stored in the secure data area 302 at the time of manufacturing the recordable media 301.

Contents 305 is the contents to be played by the portable device having contents playing function 101. The contents 305 is stored in the data area 303 after being encrypted based on a private key encryption system such as DES encryption system, in which a key for encryption and a key for decryption are identical. The contents 305 in this embodiment is digital music data such as MP3, AAC (Advanced Audio Coding), and LPCM (Linear Pulse Code Modulation).

A contents key 306 is a key for decrypting the contents 305. The contents key 306 is stored in the secure data area 302 after being encrypted. This encryption is based on a private key encryption system.

Media key data 307 is data that is necessary in creating a contents key decryption key, which is a key to be used in decrypting the contents key 306. The media key data 307 is stored in the secure data area 302. The contents key decryption key will be created based on the media key data 307 and the media ID 304.

Figure 4:
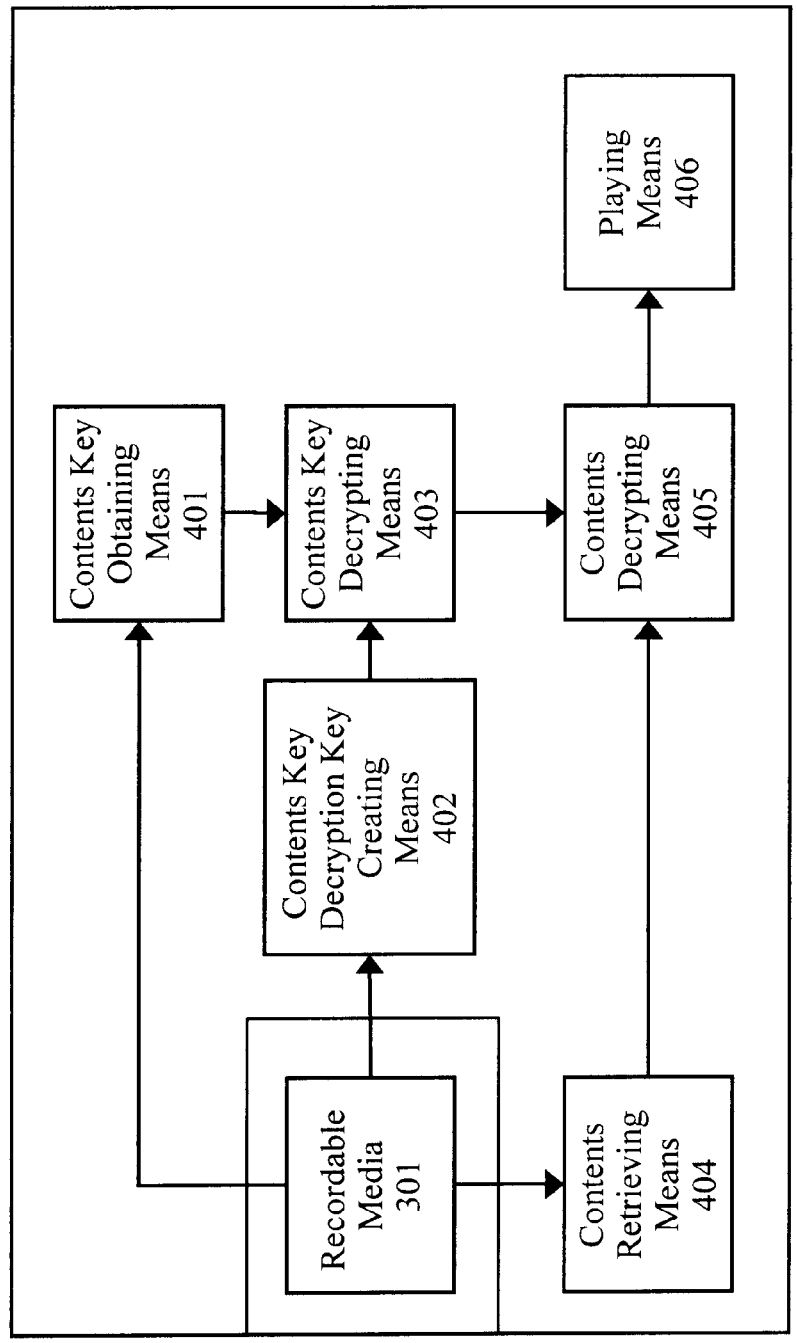
FIG. 4 shows a structure of the contents playing function activator.

Now, the contents playing function activator 104 will be explained referring to FIG. 4. The contents playing function activator 104 includes contents key obtaining means 401, contents key decryption key creating means 402, contents key decrypting means 403, contents retrieving means 404, contents decrypting means 405, and playing means 406.

The contents key obtaining means 401 obtains the contents key 306 from the secure data area 302 of the recordable media 301.

The contents key decryption key creating means 402 obtains the media ID 304 and the media key data 307 from the secure data area 302 of the recordable media 301. The contents key decryption key creating means 402 then creates a contents key decryption key based on the media ID 304 and the media key data 307.

The contents key decrypting means 403 decrypts the contents key that the contents key obtaining means 401 obtained, using the contents key decryption key created by the contents key decryption creating means 402.

The contents retrieving means 404 retrieves contents 305 from the data area 303 of the recordable media 301. The contents decrypting means 405 decrypts the contents 305 that the contents retrieving means 404 retrieved, using the contents key 306 decrypted by the contents key decrypting means 403.

The playing means 406 plays the contents 305 decrypted by the contents decryptiing means 405.

Figure 5:
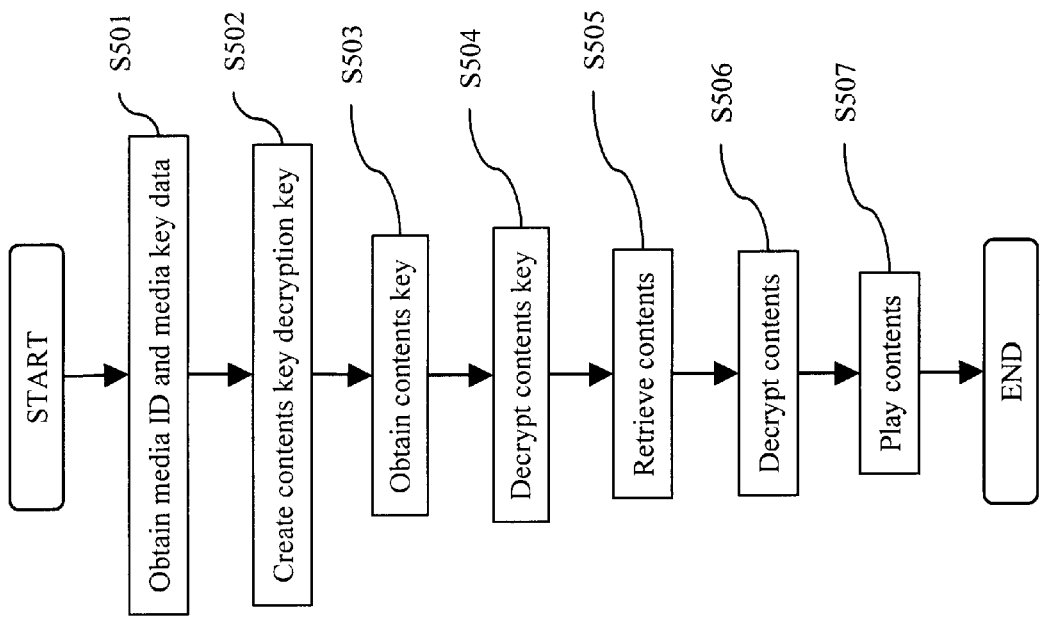
FIG. 5 shows a flowchart of an operation of playing contents, performed by the contents playing function activator.

The operation of playing the contents 305 performed by the contents playing function activator 104 having the aforesaid structure will now be explained with reference to the flowchart shown in FIG. 5.

In S501, the contents key decryption key creating means 402 obtains the media ID 304 and the media key data 307 from the secure data 302 of the recordable media 301.

In S502, the contents key decryption key creating means 402 creates a contents key decryption key based on the media ID 304 and the media key data 307 obtained in S501.

In S503, the contents key obtaining means 401 obtains the contents key 306 from the secure data 306 of the secure data area 302 of the recordable media 301.

In S504, the contents key decrypting means 403 decrypts the contents key 306 obtained in S503, using the contents key decryption key that has been created in S502.

In S505, the contents retrieving means 404 retrieves the contents 305 from the data area 303 of the recordable media 301.

In S506, the contents decrypting means 405 decrypts the contents 305 retrieved in S505, using the contents key 306 which has been decrypted in S504.

In S507, the playing means 406 plays the contents that has been decrypted in S506.

The above concludes the explanation of the contents playing function activator.

Although the power supply control means 108 compares the battery remainder with a predetermined value in this embodiment, the value to be compared with the battery remainder may be configured by the consumer who uses the portable device having contents playing function 101.

Although the contents 305 is music data in this embodiment, the contents 305 is not limited to such data. The contents 305 may also be staticimage data such as JPEG (Joint Photographic Expert Group), moving image data such as MPEG 1/2/4, digital text data such as HTML (Hyper Text Markup Language), digital newspaper, digital books, or games.

As stated above, the multiple function data portable device in accordance with the present invention can operate only basic functions of the portable device when the battery remainder is low. Therefore, the multiple function data portable device can function as a portable device for a longer period of time.

What is claimed is:

1. A multiple function portable device having a plurality of functions, said multiple function portable device comprising:

a battery that supplies power;

battery remainder monitoring means for monitoring a remainder of said battery;

power supply means for retrieving power from said battery and supplying power to each of the functions independently; and power supply control means for controlling said power supply means and thereby controlling power supply to each of the functions;

said power supply control means commanding said power supply means to stop supplying power to a specific function out of the plurality of the functions when the remainder of said battery becomes lower than a certain value;

wherein the specific function to which the power supply is stopped when the battery remainder becomes lower than the certain value is a function of playing contents, the contents being stored in a recordable media after being encrypted;

wherein the recordable media includes a media ID and a plurality of different memory areas, the media ID uniquely identifying the recordable media;

wherein at least one of the memory areas is a secure data area that cannot be accessed unless there is an authentication between the recordable media and a device accessing the recordable media;

wherein the encrypted contents is stored in a memory area which is not the secure data area; and wherein a key for decrypting the encrypted contents is stored in the secure data area after being encrypted with a key which is created based on the media ID.

2. A method of supplying power for use in a multiple function portable device having a plurality of functions, the multiple function portable device receiving power supply from a battery, said method comprising:

measuring a remainder of the battery; and stopping the power supply to a specific function out of the plurality of functions when the battery remainder measured becomes lower than a predetermined value;

wherein the specific function to which the power supply is stopped is a function of playing contents stored in a recordable media;

wherein the contents stored in the recordable media is encrypted;

wherein the recordable media includes a media ID and a plurality of different memory areas, the media ID uniquely identifying the recordable media;

wherein at least one of the memory areas is a secure data area that cannot be accessed unless there is an authentication between the recordable media and a device accessing the recordable media;

wherein the encrypted contents is stored in a memory area which is not the secure data area; and wherein a key for decrypting the encrypted contents is stored in the secure data area after being encrypted with a key which is created based on the media ID.

* * * * *